United States Patent
Rawlins et al.

(10) Patent No.: US 11,200,006 B2
(45) Date of Patent: Dec. 14, 2021

(54) ELECTRONIC MEMORY DATA STORAGE SYSTEM HAVING MEMORY CHIPS TRANSPORTABLE TO MEMORY CONTROLLER DRIVES

(71) Applicant: International Business Machines Corporation, Armonk, NY (US)

(72) Inventors: Benjamin K. Rawlins, Tucson, AZ (US); Emmanuel B. Gonzalez, Guadalajara (MX); Shaun E. Harrington, Sahuarita, AZ (US); Ezra Hartz, Saddlebrook, AZ (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 16/394,016

(22) Filed: Apr. 25, 2019

(65) Prior Publication Data

US 2020/0341693 A1    Oct. 29, 2020

(51) Int. Cl.
*G06F 3/06* (2006.01)

(52) U.S. Cl.
CPC .......... *G06F 3/0686* (2013.01); *G06F 3/0604* (2013.01); *G06F 3/0658* (2013.01); *G06F 3/0688* (2013.01)

(58) Field of Classification Search
CPC ................ G06F 3/0686; G06F 3/0688; G11B 15/68–6895
See application file for complete search history.

(56) References Cited

U.S. PATENT DOCUMENTS

| | | | | |
|---|---|---|---|---|
| 5,832,523 | A * | 11/1998 | Kanai | .................. G06F 3/0608 |
| 7,289,885 | B2 | 10/2007 | Basham et al. | |
| 7,970,978 | B2 | 6/2011 | Luo et al. | |
| 8,458,395 | B2 | 6/2013 | Kay | |
| 9,766,811 | B1 * | 9/2017 | Slik | ....................... G06F 3/0626 |
| 2002/0159182 | A1 * | 10/2002 | Albrecht | ............ G11B 23/0302 360/69 |

(Continued)

OTHER PUBLICATIONS

IBM. "IBM TS4500 Tape Library." 2017. https://www.ibm.com/downloads/cas/9Q4BK6MJ.*

(Continued)

*Primary Examiner* — Nathan Sadler
(74) *Attorney, Agent, or Firm* — Scully, Scott, Murphy & Presser, P.C.

(57) ABSTRACT

One or more embodiments of a data storage system and method are disclosed having one or more memory modules containing memory chips to store data that are separate from a memory controller where the memory module is transportable and removeably communicative or connectable with the memory controller. A data storage library is also disclosed having a plurality of storage areas to hold a plurality of the memory modules; one or more memory controller drives for performing memory operations in association with the memory chips on the plurality of memory modules; a transport system to move between the plurality of storage areas and the memory controller drive; a library controller to control the movement of the transport system between the plurality of storage areas and the memory controller drive; and a housing configured to house the plurality of storage areas, the memory controller drive, and the transport system.

20 Claims, 6 Drawing Sheets

(56) References Cited

U.S. PATENT DOCUMENTS

| | | | | |
|---|---|---|---|---|
| 2006/0002009 A1* | 1/2006 | Ridl | ............... | G11B 17/225 |
| | | | | 360/98.06 |
| 2006/0132964 A1* | 6/2006 | Lau | ............... | G06F 3/0625 |
| | | | | 360/92.1 |
| 2009/0049310 A1* | 2/2009 | Carlson | ............ | G06F 3/0619 |
| | | | | 713/193 |
| 2010/0280651 A1* | 11/2010 | Edling | ............ | G11B 23/042 |
| | | | | 700/214 |
| 2010/0281207 A1 | 11/2010 | Miller et al. | | |
| 2011/0178994 A1* | 7/2011 | Fujihara | ............ | G06F 3/0604 |
| | | | | 707/690 |
| 2011/0238905 A1* | 9/2011 | Amir | ............ | G11B 23/042 |
| | | | | 711/111 |
| 2017/0371307 A1* | 12/2017 | Slik | ............ | B65G 1/06 |
| 2020/0302966 A1* | 9/2020 | Herdendorf | ............ | G11B 15/682 |

OTHER PUBLICATIONS

Eshghi et al. Inside Solid State Drives (SSDs). 2018. Springer. 2nd Ed. pp. 1-3.*

Tape Emulation Using Removable, Solid State Storage, IBM, May 10, 2008.

Disclosed Anonymously, A Nand Flash Memory Controller Exporting a Nand Interface, Oct. 10, 2006.

* cited by examiner

Data Storage System
Fig. 1

ELECTRONIC MEMORY DATA STORAGE SYSTEM HAVING MEMORY CHIPS TRANSPORTABLE TO MEMORY CONTROLLER DRIVES

BACKGROUND

The present disclosure relates to a data storage system, and in one or more embodiments, flash memory systems and/or data storage libraries for the handling, storage, and/or transfer of data.

Flash or electronic media for storing data is known. Flash memory is electronic nonvolatile data storage medium that can be electrically erased and reprogrammed. Flash memory is faster than tape and disk memory for read, write, and erase times, however the cost of flash memory is much higher than tape storage and higher than spinning disk storage. Flash memory typically includes the memory package that contains the memory chips or dies (e.g., the part(s) that hold the data), and an integrated flash memory controller. The flash memory controller manages the data stored on flash memory and communicates with a computer, a processor, or electronic device. One factor effecting the cost of flash memory is the type of controller that is packaged with the flash memory. Controllers can range from relatively inexpensive such as, for example, for use on USB drives, to very expensive on enterprise grade solid-state drives. Typically, flash memory is available and sold with an integrated, incorporated controller, e.g., the controller is bundled with and tied to the flash memory chips, so that the cost of flash memory is tied to and requires the purchase of the controller.

SUMMARY

The summary of the disclosure is given to aid understanding of a data storage system, data storage library, and method of handling, e.g., storing, data, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the data storage system, data storage library and their method of operation to achieve different effects.

In accordance with an aspect of the disclosure, a data storage system is disclosed where the system includes a plurality of storage areas to hold a plurality of memory modules containing memory chips for storing data; one or more memory controller drives for performing memory operations in association with the memory chips on the plurality of memory modules; a transport system to move between the plurality of storage areas and the memory controller drive; a library controller to control the movement of the transport system between the plurality of storage areas and the memory controller drive; and a housing configured to house the plurality of storage areas, the memory controller drive, and the transport system. In one or more embodiments, the data storage includes a plurality of memory controller drives and the system is configured to hold a greater number of memory modules in the plurality of storage areas than the number of memory controller drives. In a further aspect, the data storage system further comprises a plurality of the memory modules. The memory modules in an embodiment are moveable by the transport system to a location within the housing to communicate with the one or more memory controller drives. In an embodiment, the system comprises a greater number of memory modules than the number of memory controller drives. In an embodiment, the capacity of the storage areas to hold memory modules is in the range of about 50:1 to about 500:1 memory modules to memory controller drives, and in a further embodiment, the number of memory modules to memory controller drives is about 1000:1, or greater.

In one or more embodiments a data storage system is disclosed that includes memory modules and one or more memory controller drives where the memory modules have one portion of a communication mechanism and the one or more memory controller drives has another portion of the communication mechanism, the connector mechanism configured to connect the memory modules to the memory controller drive so that the memory module can communicate with the memory controller drive.

The transport system in an embodiment comprises an accessor and rails, the accessor configured to move along rails in the housing to move between the plurality of storage areas and the one or more memory controller drives. The accessor in an aspect is configured to transport one or more memory modules between the plurality of storage areas and the one or more memory controller drives. In one or more embodiments, the system is configured to transport memory modules to the one or more memory controllers to facilitate communication between the memory module and the memory controller. In an aspect, the data storage system is further configured to communicate with a host to perform the memory operation, and according to an embodiment, the housing further comprises an I/O station for receiving and retrieving memory modules.

In accordance with an aspect of the disclosure, a method of handling data in a data storage system is disclosed where the method comprises receiving a request for data; determining a storage location within the system where a memory module containing the data is located; moving an accessor to the storage location; moving the accessor with the memory module to a memory controller drive; performing a memory operation with the memory controller drive and the memory module; and moving the memory module away from the memory controller drive. The method in an aspect includes retrieving the memory module from the storage location so that the accessor can transport the memory module to the memory controller drive. In one or more embodiments, the accessor transports the memory module after the memory operation with the memory controller drive back to the storage location. The method in an embodiment further comprises connecting the memory module to the memory controller drive in a manner so that the memory controller drive communicates with the memory chips on the memory module. In an aspect, the method further includes instructing the accessor on movement directions to the storage location.

In yet another embodiment a data storage library is disclosed comprising a plurality of memory modules containing memory chips for storing data; a plurality of storage locations for the memory modules; one or more memory controller drives for performing memory operations in association with the memory chips on the plurality of memory modules; a transport system to move between the plurality of storage locations and the memory controller drive; a library controller to control the movement of the transport system between the plurality of storage areas and the memory controller drive; a housing configured to house the plurality of storage areas, the memory controller drive, and the transport system; a processor; one or more computer readable storage media that in an embodiment includes non-transistory storage media; and programming instructions stored on the one or more computer readable storage media for execution by the processor, the programming instructions comprising (a) programming instructions to determine a storage location within the library where a memory module containing the data is located; (b) programming instructions to move an accessor to the storage location; (c) programming instructions to move the accessor with the memory module to a memory controller drive; programming instructions to perform a memory operation with the memory controller drive and the memory module; and programming instructions to move the memory module away from the memory controller drive. The storage library in an embodiment further comprises programming instructions to retrieve the memory module from the storage location so that the accessor can transport the memory module to the memory controller drive. The storage library according to another aspect further comprises programming instructions to transport the memory module after the memory operation with the memory controller drive back to the storage location.

BRIEF DESCRIPTION OF THE DRAWINGS

The various aspects, features, and embodiments of the data storage system, data storage library, and/or their method of operation will be better understood when read in conjunction with the figures provided. Embodiments are provided in the figures for the purpose of illustrating aspects, features, and/or various embodiments of the data storage system, the data storage library, and their method of operation, but the claims should not be limited to the precise system, assembly, subassembly, arrangement, structures, features, aspects, embodiments, and/or devices shown, and the systems, assemblies, subassemblies, arrangements, structures, features, aspects, embodiments, methods, processes, and/or devices shown may be used singularly or in combination with other systems, assemblies, subassemblies, arrangements, structures, features, aspects, embodiments, methods and/or devices.

DETAILED DESCRIPTION

The following description is made for the purpose of illustrating the general principles of the present disclosure and is not meant to limit the inventive concepts claimed herein. In the following detailed description, numerous details are set forth in order to provide an understanding of the data storage system, data storage library, and their method of operation, however, it will be understood by those skilled in the art that different and numerous embodiments of the data storage system, data storage library, and their method of operation may be practiced without those specific details, and the claims and disclosure should not be limited to the arrangements, structures, systems, assemblies, subassemblies, circuitry, features, aspects, processes, methods, techniques, embodiments, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification and claims, specify the presence of stated features, integers, aspects, arrangements, embodiments, structures, systems, assemblies, subassemblies, steps, operations, elements, and/or components, but do not preclude the presence or addition of one or more other features, integers, aspects, arrangements, embodiments, structures, systems, assemblies, subassemblies, steps, operations, elements, components, and/or groups thereof.

Typically, flash or electronic memory is available where the flash memory and memory controller are bundled together which can be efficient if each bundled package is used separately, and a memory controller is needed for each flash memory package. This disclosure reduces the high cost of flash or electronic memory by reducing the number of memory controllers needed for electronic or flash memory packages or modules, e.g., flash memory chips. In one or more embodiments, a flash memory package, also referred to as a flash memory module, is separated from the memory controller so that the cost of the flash memory package and/or flash memory system can be reduced. That is the customer/consumer of the memory can purchase or utilize the memory controller separate from the flash memory package, e.g., the flash memory chips. Instead of a ratio of 1:1 between the memory module and the memory controller, the ratio can be customized, and in an aspect a more favorable memory module to memory controller ratio can be employed, such as, for example, greater than a 1:1 ratio.

Separating the memory controller from the flash or electronic memory package or module also provides better defective part replacement visibility between the memory controller and the memory package. For example, instead of replacing the entire memory system including the memory package and integrated memory controller when only the memory package is defective, separating the memory controller from the memory package permits replacement of the defective memory package without replacing the memory controller, or vice versa. Additionally, not having to power the flash memory package, e.g., the flash memory chips, when the memory controller is not connected to the flash memory can result in significant power and heat reduction, which can also result in a cost savings.

In an aspect, the disclosure is directed to flash memory modules, e.g., Nand Flash memory modules, packaged separately from the memory controller. That is, in an embodiment, a data storage system includes a memory module containing memory chips and a separate memory controller package or drive where the memory module is able to be transported separate from and/or communicate with the memory controller package. This permits the memory package to be separately replaced from the memory controller package. The memory module being separate and independent from the memory controller also permits the number of memory controllers to be customized to the design needs of the data storage system and/or data storage library instead of having one memory controller for each package or module of flash memory. The desired data storage system can include a large data pool of many flash memory modules, that are not constantly accessing and/or using each flash memory module, so that greater efficiency is attained over an integrated memory controller tied and/or bundled to each memory module. Separating the memory module into one package and the memory controller into a separate drive package will provide a more efficient, lower cost system.

In one or more embodiments, separating the flash memory into a package separate from the memory controller drive, also referred to as the memory controller package or memory controller drive package, will permit less memory controller drive packages and more memory modules. Data storage systems can be designed where the memory controller to memory module ratios are customized and in one or more embodiments may have a memory controller drive package to memory module ratio of less than 1:1, and can have a memory controller drive package to memory module ratio of 1:1000. Other ratios of memory controller drive packages to memory modules are contemplated.

In one or more embodiments, an interface is provided to connect and establish communication between the memory module and the memory controller drive package, and in an aspect, a connection mechanism is provided between the memory module and the memory controller drive package. In one or more embodiments, a connector interface is set up between the memory controller drive package and the memory module. For example, a peripheral component interconnect (PCI) connector, more preferably a PCI express (PCIe) connector, can be used to connect the flash memory module to the memory controller drive package. Other connectors are contemplated by the disclosure. In one or more embodiments, the memory module can be manually connected to the memory controller package, and/or alternatively a mechanism can be provided to connect, and in an aspect automatically connect, the flash memory module to the memory controller package.

In one or more embodiments, a data storage system, sometimes referred to as a data storage library, having multiple memory modules, preferably flash memory modules, and one or more memory controller drives is provided. A transport mechanism in one or more embodiments is provided to move or transport the one or more flash memory modules to the one or more memory controller drive(s), and in an aspect to connect the memory module to a memory controller drive, so that data can be accessed and/or written without a permanent physical connection between the memory module and the memory controller drive. In an embodiment, the flash memory module can be moved from a storage slot to the memory controller drive package so that data can be accessed and/or written, preferably without a permanent connection, more preferably without a permanent physical connection between the memory module and the memory controller. In one or more embodiments, an automatic transport system, including in an aspect a robotic transport system, may be provided to transport and move the flash memory modules and/or memory controller drives. These and other attributes and features of the disclosed data storage package, data storage system, and data storage library will be apparent from the disclosure and figures that follow.

Figure 1:
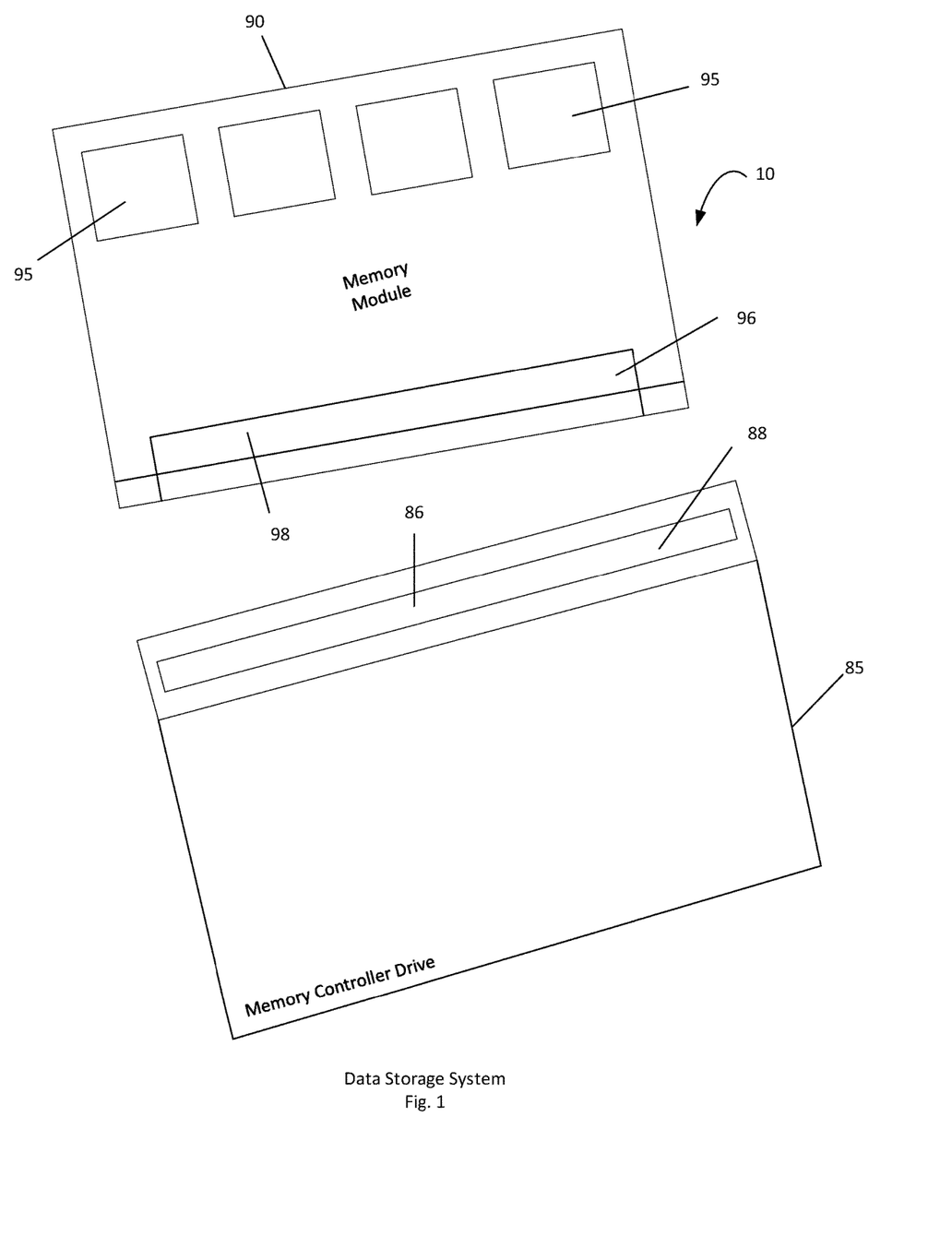
FIG. 1 is a perspective view of an example of a data storage system according to an embodiment of the disclosure.

FIG. 1 illustrates an example of a data storage or memory system 10, that includes a memory package or module 90, preferably a flash memory module, separate from a memory controller drive 85, also referred to as a memory controller package 85. In one or more embodiments, the memory module 90 includes one or more flash memory chips 95, and, in an embodiment, numerous flash memory chips 95. The flash memory chips 95 store data in a manner well known in the art. The flash memory chips 95 in an embodiment are Nand flash memory chips. The flash memory modules 90 can be configured to contain an optimal amount of flash memory chips 95. The memory controller package 85 in one or more embodiments manages the data stored on the flash memory module and communicates with a computer or electronic device. The memory controller package 85 for example controls the reading, writing, and or erasing operations to the flash memory module 90.

The memory module 90 preferably is not permanently connected to, integrated with, or in communication with, and in an embodiment is not permanently physically connected to, the memory controller package 85. The flash memory module 90 in one or more embodiments is removeably connectable with the memory controller package 85. That is, the memory module 90 can be connected to and disconnected from the memory controller package 85. The memory module 90 in one or more embodiments includes a connector or communication interface 96 to facilitate connection to the memory controller package 85 so that memory module 90 can communicate with the memory controller package 85.

In an embodiment, the memory module connector or communication 96 is a projecting or male portion 98 of a connector, preferably a PCI connector, more preferably a PCIe connector. The memory controller package 85 includes a connector or communication interface 86 to facilitate connection to the memory module 90, and more specifically to facilitate connection with the communication interface 96 and communication between the memory module 90 and the memory controller package 85. In an embodiment, the memory controller package connector or communication interface 86 is a slot or female portion 88 of a connector, preferably a PCI connector, more preferably a PCIe connector. The projecting portion 98 of the connector 96 is inserted into the slot 88 of the connector 86 so that the memory controller package 85 communicates with the memory module 90, and/or so data on the memory chips 95 can be accessed. The connector portions 96 and 86 can be rearranged, and other connectors or communication mechanisms and modules permitting and facilitating communication between the memory module 90 and the memory controller package 85 are contemplated. The memory module communication interface and the memory controller package communication interface preferably are configured for ease of connection to and/or communication between the two components. Other connector or communication interfaces other than shown in FIG. 1 are contemplated. For example, the memory controller drive package could be configured to be insertable within the memory module.

Figure 2:
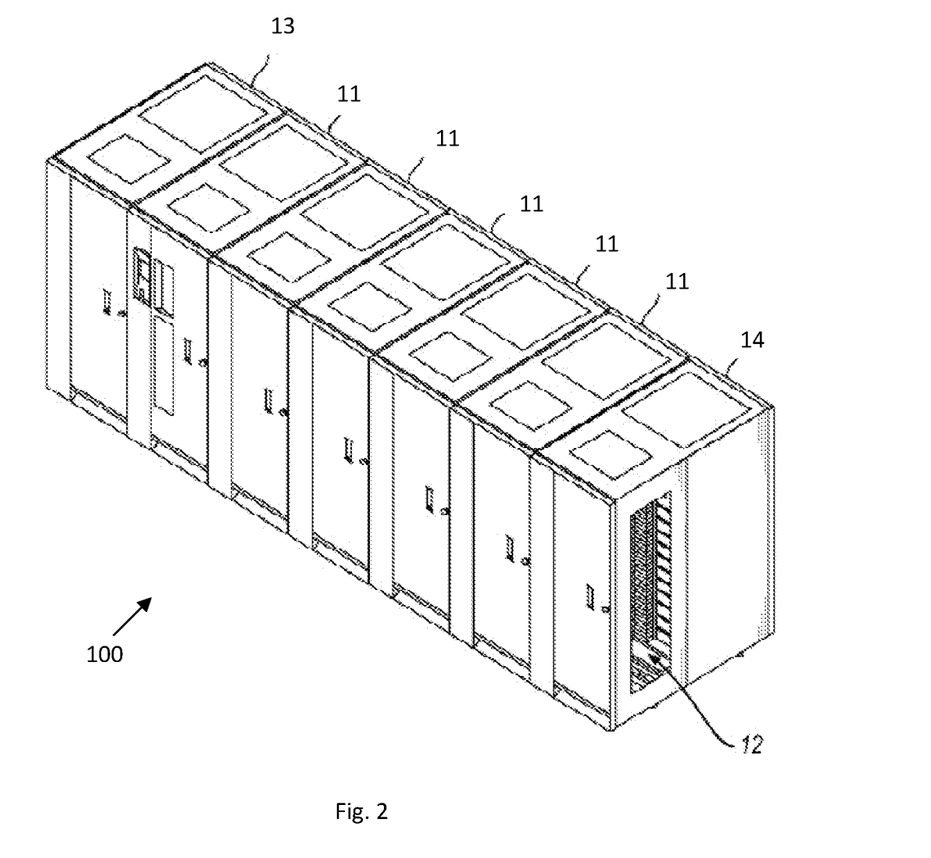
FIG. 2 is an example of an automated data storage library according to an embodiment of the disclosure.
Figure 3:
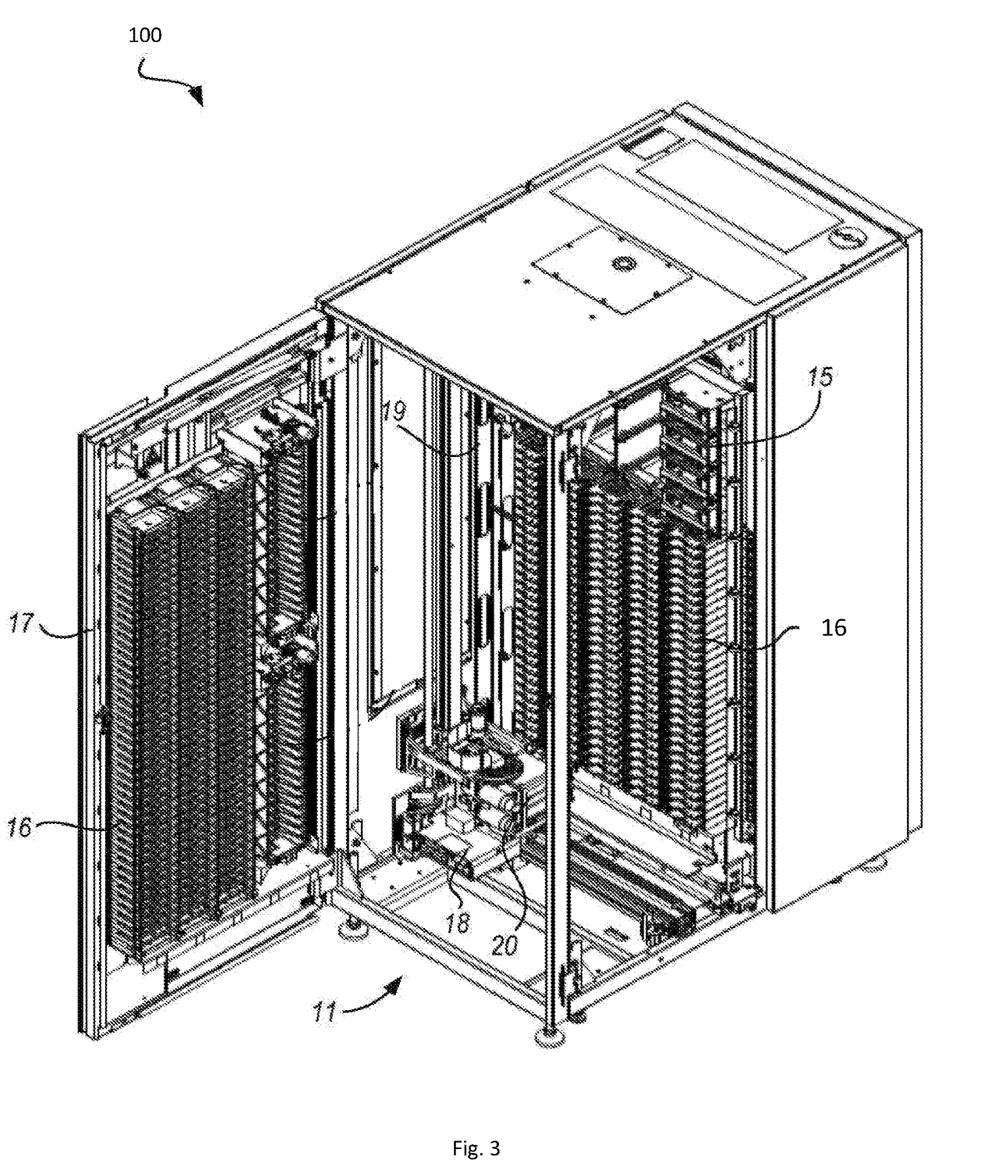
FIG. 3 is a perspective view of a storage frame from the data storage library of FIG. 2.

FIGS. 2 and 3 illustrate an example of a data storage system, e.g., an automated data storage library 100, which stores and retrieves memory modules 90, containing data storage chips 95, from storage locations. Automated data storage library 100 provides cost effective storage and retrieval of large quantities of data. The data in automated data storage library 100 is stored on flash memory modules 90 that are, in turn, stored at, for example, storage slots 16 or the like inside the library in a fashion that renders the flash memory modules 90, and its resident data, accessible for physical retrieval.

The library 100 in the embodiment of FIG. 2 comprises a left hand service bay 13, one or more storage frames 11, and right hand service bay 14. A frame may comprise an expansion component of the data storage library. Thus, storage frames may be added or removed to expand or reduce the size and/or functionality of the library. In addition to memory modules 90, automated data storage library has one or more memory controller drives 15 (which may also be referred to as memory controller packages or memory controller drive packages) that store data to, and/or retrieve data from, the memory modules 90. Automated data storage library 100 also has one or more I/O stations at which flash memory modules are supplied or added to, or removed from, the library. The transport of memory modules between data storage slots, memory controller drive(s), and I/O stations can be accomplished by a module transport system, which in an embodiment includes one or more accessors, preferably robotic accessors. The accessors in one or more embodiments transport memory modules to the memory controller drives by moving, for example, in the horizontal (X) and vertical (Y) directions. The accessors in an embodiment have grippers for physically retrieving the selected memory modules from the storage slots within the automated data storage library. According to different approaches, frames may include additional storage slots, memory modules, memory controller drives, import/export stations, accessors, operator panels, controller cards, communication cards, etc. Moreover, an accessor aisle 12 preferably extends between the storage frames and bays of the embodiments in FIG. 2 thereby preferably allowing an accessor to move between frames.

FIG. 3 shows an exemplary embodiment of a storage frame 11, which may act as the base frame of the library 100. The storage frame 11 illustrated in FIG. 3 may have only a single accessor 18 (i.e., there are no redundant accessors) and no service bay. However, in other embodiments, a storage frame may include multiple accessors (preferably robotic accessors) and/or service bays, and/or an accessor aisle between and within the frames. Looking to FIG. 3, the library 100 is arranged for accessing memory modules in response to commands from at least one external host system (not shown). The library 100 includes a plurality of storage slots 16 on front door 17 and a plurality of slots 16 on rear wall 19, both of which may be used for storing memory modules that contain data storage media, e.g., flash memory chips 95. According to one approach, the storage slots 16 can be configured to store a single memory module, or to store a plurality of memory modules. The arrangement and positioning of the storage slots 16 can be different then illustrated in FIG. 3. The shape and size of the flash memory modules can be configured to be efficient for storage in the library, for accessor handling needs and capabilities, and memory controller drive connection (and/or insertion) needs.

With continued reference to FIG. 3, the storage frame 11 of the library 100 also includes at least one controller drive 15, e.g., for reading, writing and/or erasing data in the memory modules. The interface and/or connection of the memory controller drive and memory modules can be a connector, such as a PCI connector or ePCI connector, having projections and slots to accommodate communication, and in an embodiment connection, between the two components. In an embodiment, at least a portion of a memory module is received within at least a portion of the memory controller drive 15, to facilitate communication between the two components. In one or more embodiments, there are more memory modules 90 (and more storage slots for receiving the memory modules) than the number of memory controller drives 15, and, in an aspect, greater than a 1:1 ratio of memory modules (or memory module locations) to memory controller drives, more preferably greater than 2:1, more preferably greater than 10:1, greater than 50:1, or greater than 100:1. In an embodiment, the ratio of storage slots 16 (and the number of memory modules) to memory controller drivers 15 is about 1000:1 and greater. The number of storage slots (the capacity to hold memory modules) to memory controller drives will depend upon a number of factors, including, for example, how much data, e.g., the number of flash memory chips, is on each memory module. It should be recognized that the memory modules can vary how much data they hold, and or the number of flash memory chips. Thus, in one or more embodiments, the memory controller drive/package will interface with many different memory modules. According to one or more approaches, the memory controller drives 15 contain one or more memory controllers that are used to read, write and/or erase data with respect to the memory module. Additionally, one or more accessors 18 can be used to transport memory modules between the plurality of storage slots 16 and/or the memory controller drive(s) 15.

While the transport system for retrieving and transporting the memory modules has been described an shown as an acessor with a gripper that moves along rails within the data storage system/library, it will be appreciated that various technologies, including as yet undeveloped technologies, can be utilized to retrieve and transport the memory modules to the memory controller packages/drives. For example, a transport system that does not utilize rails, such as, for example, unmanned aerial vehicles (UAVs), also referred to as drones, could be used as or part of the transport system. In addition, while the data storage system and/or library has been described as transporting the memory modules, it can be appreciated that the memory controllers can be transported to the memory modules, or both the memory modules and memory controllers can be transported to a different location for performing a memory operation.

As illustrated, the storage frame 11 may optionally include an operator panel or other user interface, such as a web-based interface, which allows a user to interact with the library 100. Optionally, the library 100 may have an associated software application having a user interface, which also allows a user to interact with the library 100. The software application may be executable on a computing device, a remote server, a cloud or a mobile device.

In one approach, the data storage library is controlled, not by a central data storage system controller, but rather, by a distributed data storage control system for receiving logical commands and converting the commands to physical movements of the accessor and gripper, and for operating the memory controllers in accordance with the desired physical movements. The distributed data storage control system may also provide logistical support, such as responding to host requests for element status, inventory, library status, etc. The specific commands, the conversion of those commands to physical movements of the accessor, gripper, and other components, may be of a type known to those of skill in the art. While the automated data storage library 100 has been described as employing a distributed data storage control system, various other approaches described and/or suggested herein may be implemented in automated data storage library, such as, but not limited to, an automated data storage library having one or more library controllers that are not distributed.

Figure 4:
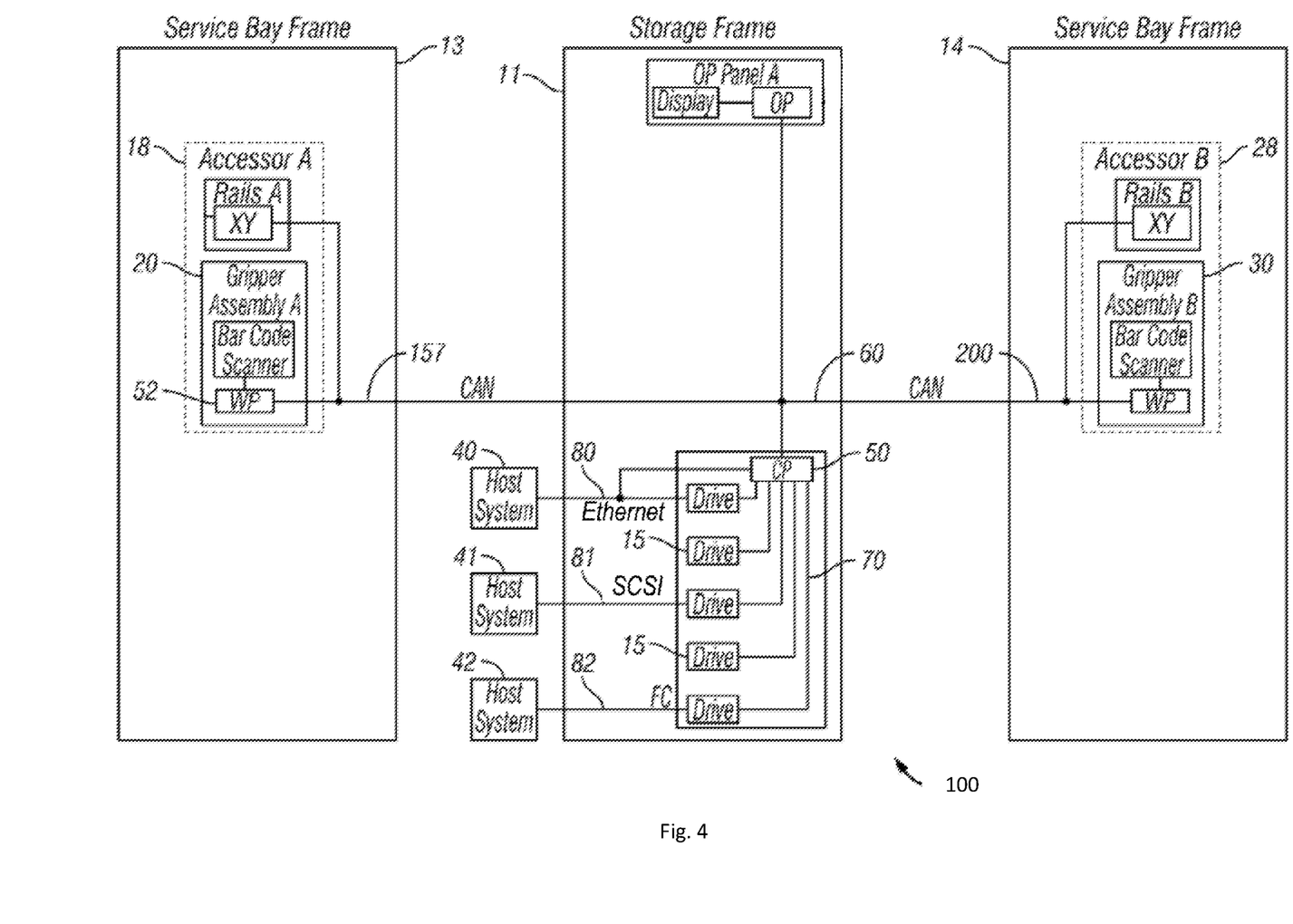
FIG. 4 is a schematic diagram of one embodiment of an automated data storage library.

With reference to FIG. 4, library 100 receives commands from one or more host systems 40, 41, 42. The host systems 40, 41, 42, such as host servers, communicate with the library directly, e.g., on line 80 (e.g., path), through one or more control ports (not shown), or through one or more memory controller drives 15 on paths 80, 81, 82. Thus, in different approaches, the host systems 40, 41, 42 may provide commands to access particular memory modules and move the memory modules, for example, between the storage slots 16 and the memory controller drives 15. The commands are typically logical commands identifying the memory module, the memory chips on the memory module, and/or logical locations for accessing the memory location/data. Furthermore, it should be noted that the terms "commands" and "work requests" are used interchangeably herein to refer to such communications from the host system 40, 41, 42 to the library 100 as are intended to result in accessing particular data on memory modules within the library 100 depending on the desired approach.

According to one embodiment, the library 100 may be controlled by a library controller. Moreover, in various approaches, the library controller may include a distributed control system receiving the logical commands from hosts, determining the required actions, and/or converting the actions to physical movements of the first and/or second accessors 18, 28 and/or gripper assemblies 20, 30. In another approach, the distributed library control system may have a plurality of processor nodes, each having one or more computer processors. According to one example of a distributed control system, a communication processor node 50 may be located in a storage frame 11. The communication processor node provides a communication link for receiving the host commands, either directly or through the memory controller drives 15, via at least one external interface, e.g., coupled to line 80.

As illustrated in FIG. 4, the communication processor node 50 is coupled to each of the memory controller drives 15 of a storage frame 11, via lines 70, and may communicate with the memory controller drives 15 and with host systems 40, 41, 42. Alternatively, the host systems 40, 41, 42 may be directly coupled to the communication processor node 50, at line 80 (e.g., input) for example, or to control port devices (not shown) which connect the library to the host system(s) with a library interface similar to the drive/library interface. As is known to those of skill in the art, various communication arrangements may be employed for communication with the hosts and with the memory controller drives. In the example of FIG. 3, lines 80 and 81 are intended to be Ethernet and a SCSI bus, respectively, and may serve as host connections. However, path 82 comprises an example of a Fibre Channel bus which is a high speed serial data interface, allowing transmission over greater distances than the SCSI bus systems.

According to some approaches, the memory controller drives 15 may be in close proximity to the communication processor node 50, and may employ a short distance communication scheme, such as Ethernet, or a serial connection, such as RS-422. Thus, the memory controller drives 15 may be individually coupled to the communication processor node 50 by lines 70. Alternatively, the memory controller drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, memory controller drives 15, networks 60, etc. An automated data storage library 100 typically comprises one or more library controllers to direct the operation of the automated data storage library. A library controller may take many different forms and may comprise, for example, but is not limited to, an embedded system, a distributed control system, a personal computer, a workstation, etc.

Figure 5:
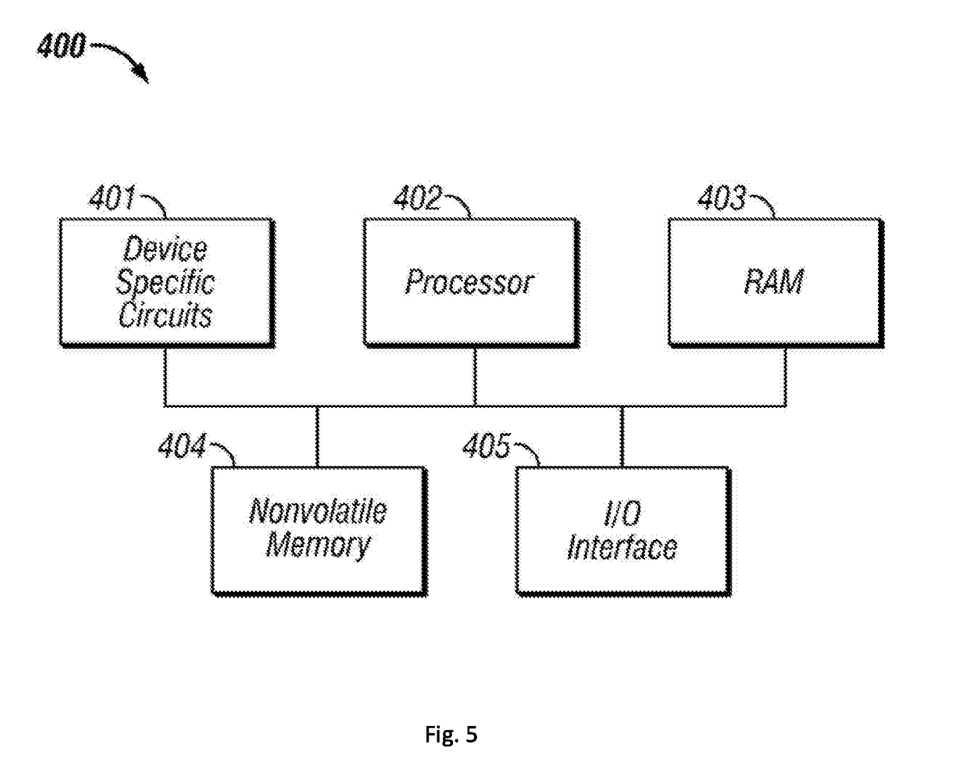
FIG. 5 is a block diagram depicting a data storage library controller configuration according to one embodiment.

Referring now to FIG. 5, a controller 400, as can be used, for example, in the memory controller package, the memory controller drive, and/or the library controller, is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to one or more approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data containing programming instructions that can be executed to cause the processor 402 to perform certain functions.

In some embodiments, the I/O interface 405 may include a communication interface that allows the processor 402 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The controller 400 may communicate with an external device via the communication interface 405 in any communication protocols such as Automation/Drive Interface (ADI).

The device specific circuits 401 provide additional hardware to enable the controller 400 to perform unique functions including, for example, motor control of an accessor cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a memory controller and/or library controller may comprise one or more dedicated controllers, depending on the desired embodiment. For example, there may be a primary controller and a backup controller for the memory controller drive, memory controller package, and/or library controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to one or more approaches described and/or suggested herein, a memory controller package, a memory controller drive, and/or a library controller may have a single processor or controller, or it may include multiple processors or controllers, or multiple cores in a processor chip.

Figure 6:
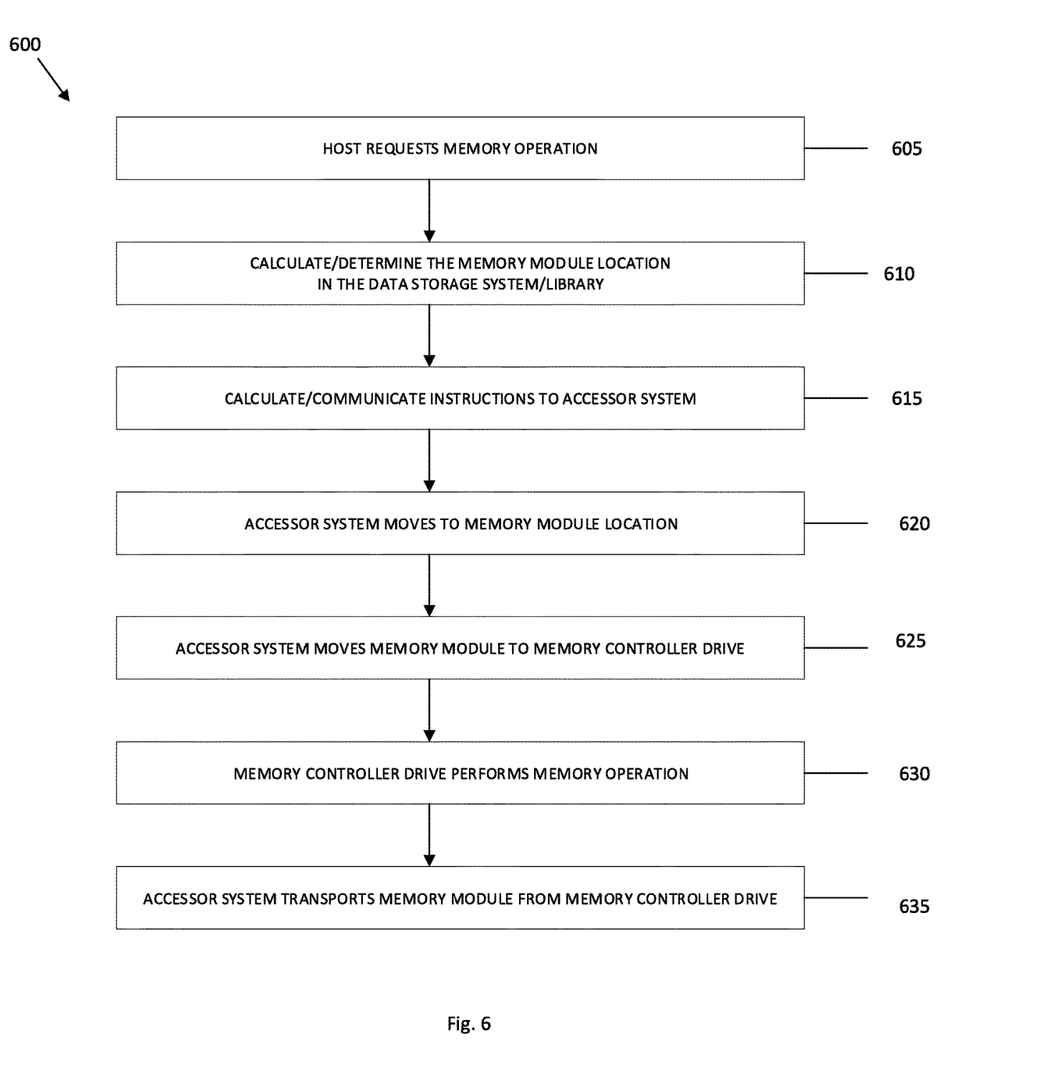
FIG. 6 is a flow diagram of a method of handling data in a data storage system and/or library, and particularly a data storage system having a plurality of memory modules where each module has one or more flash memory chips, and one or more controller drives.

FIG. 6 is an exemplary flowchart in accordance with one embodiment illustrating and describing a method of handling data in a data storage system and/or library, and more specifically a method of performing read, write, and erase operations on flash memory modules by establishing communication with a separate memory controller, in accordance with an embodiment of the present disclosure. While the method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process may be integrated and/or one or more steps may be performed together, simultaneously, or the steps may be performed in the order disclosed or in an alternate order.

In the method 600 of handling data in a data storage system and/or library, at 605, the host requests access to data, and/or to data on a memory module, that in an embodiment contains one or more flash memory chips. In one or more embodiments, at 610, the location of the memory module in the storage system/library is calculated/determined. In an aspect, the desired memory module, and/or a desired flash memory chip on a memory module, to perform an operation, e.g., a read, write, and/or erase operation, is calculated and/or determined. In one or more embodiments, the data storage system/library calculates, and/or the host system calculates and communicates to the data storage system/library, the location of the desired flash memory module (or flash memory chip, or address on the flash memory chip) that has the desired data. In an embodiment, instructions are communicated at 615 to the transport system, e.g., the robotic accessor system. In an aspect, at 615, instructions as to the movements required by the transporter, e.g., the accessor, of the transport system are calculated, and in one or more embodiments, are communicated to the transporter/accessor. In one or more embodiments, the location of the desired memory module is communicated to the transport system, e.g., the accessor, and the transport system calculates or determines the movements to undergo in order to retrieve the desired memory module.

At 620, in one or more embodiments, the accessor moves to the memory module location in the library. In an embodiment, at 625, the accessor system transports the memory module to one of the memory controller drives in the storage library. In an aspect, the accessor system can remove the desired memory module from its slot or storage location, and/or a mechanism associated with the storage slot (location) can load the memory module onto the accessor. As indicated earlier, the accessor alternatively could move to the location of the memory controller and the memory controller can be transported to the memory module (or both memory module and memory controller can be transported to desired locations) to facilitate the desired memory operation.

In one or more embodiments the memory controller drive performs the desired memory operation at 630 with the memory module, e.g., performs a read, write, and/or erase operation. In an aspect, the memory module is removed from the controller, and at 635 the accessor system transports the memory module from the controller drive. The accessor can remove the memory module from the controller driver, or a mechanism can be provided to load the memory module onto the accessor. In an embodiment, the accessor can transport the memory module to return it to the same storage slot from which it was taken or it can be transported to a different storage slot, and or transported to an I/O station to be removed from the data storage library.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 5. The memory elements can include local memory employed during actual execution of the program code, such as nonvolatile memory 404 of FIG. 5, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data storage system, the system comprising:
a plurality of memory modules, each memory module containing a plurality of flash memory chips on a printed circuit board module for storing data, the printed circuit board having a first portion of a PCI connector, without a memory controller tied or bundled to each memory module;
a plurality of storage areas to hold the plurality of memory modules;
one or more memory controller drives for performing memory operations in association with the memory chips on the plurality of memory modules, each memory controller drive being separate and independent of each memory module and having at least one memory controller such that each memory module is separate from and independently transportable relative to the at least one memory controller and the at least one memory controller is configured to perform data operations with respect to the plurality of flash memory chips on each memory module, the data operations comprising at least one of the group consisting of reading data, writing data, erasing data, and combinations thereof, the memory controller drive having a second portion of the PCI connector;
a transport system having a gripper to hold at least one of the plurality of memory modules or one of the one or more memory controller drives and configured to move between the plurality of storage areas and the one or more memory controller drives;
a library controller to control the movement of the transport system between the plurality of storage areas and the one or more memory controller drives; and
a housing configured to house the plurality of storage areas, the plurality of memory modules, the one or more memory controller drives, and the transport system, wherein the data storage system is configured to hold a greater number of memory modules in the plurality of storage areas than the number of memory controller drives.

2. The data storage system of claim 1, further comprising the plurality of the memory modules moveable by the transport system to a location within the housing to communicate with the one or more memory controller drives.

3. The data storage system of claim 2, wherein the first portion of the PCI connector is a projection portion and the second portion of the PCI connector is a slot to receive the projection portion of the PCI connector to connect each memory module to one of the one or more memory controller drives so that the memory module can communicate with the memory controller drive.

4. The data storage system of claim 1, wherein the capacity of the storage areas in the data storage system to hold memory modules is in the range of 50:1 to 500:1 memory modules to memory controller drives.

5. The data storage system of claim 1, wherein the number of memory modules to memory controller drives is in the range of 2:1 to 1000:1.

6. The data storage system of claim 1, wherein the transport system comprises an accessor and rails, the accessor configured to move along rails in the housing to move between the plurality of storage areas and the one or more memory controller drives.

7. The data storage system of claim 6, wherein the accessor is configured to transport one or more memory modules between the plurality of storage areas and the one or more memory controller drives.

8. The data storage system of claim 1, wherein the system is configured to transport memory modules to the one or more memory controllers to facilitate communication between the memory module and the memory controller.

9. The data storage system of claim 1, further configured to communicate with a host to perform the memory operation.

10. The data storage system of claim 1, wherein the housing further comprises an I/O station for receiving and retrieving memory modules.

11. A method of handling data in a data storage system, the method comprising:
receiving a request for data;
determining a storage location within the data storage system where a memory module containing the data is located, wherein the data storage system contains a plurality of storage areas to hold a plurality memory modules, each memory module containing a plurality of memory chips to contain data mounted on a printed circuit board, the printed circuit board having a projecting portion having a PCI interface, without a memory controller tied or bundled to each memory module, and wherein the data storage system further contains one or more memory controller drives configured to perform memory operations with at least one of the plurality of memory chips on the plurality of memory modules, wherein each memory controller drive is separate and independent of each memory module, has at least one memory controller to perform data operations with respect to the plurality of memory chips on each memory module, and has a slot to receive the PCI interface on the projecting portion to partially receive the memory module so that the memory module connects with and communicates with the memory controller to perform the data operations, wherein each memory module is separate from and independently transportable relative to the at least one memory controller;
moving an accessor to the storage location;
retrieving by the accessor the memory module containing the data;
moving the accessor with the memory module to a memory controller drive;
performing a memory operation with the memory controller drive and the memory module; and
moving the memory module away from the memory controller drive.

12. The method of claim 11, further comprising retrieving the memory module from the storage location so that the accessor can transport the memory module to the memory controller drive.

13. The method of claim 11, wherein the accessor transports the memory module back to the storage location after the memory operation with the memory controller drive.

14. The method of claim 11, further comprising connecting the memory module to the memory controller drive in a manner so that the memory chips on the memory module communicate with the at least one memory controller on the memory controller drive.

15. The method of claim 11, further comprising instructing the accessor on movement directions to the storage location.

16. The method of claim 11, further comprising inserting the projecting portion of the memory module within the slot of the memory controller drive such that the memory module is partially extending from the memory controller drive.

17. The method of claim 11, wherein the PCI interface is a first portion of a PCI connector and a second portion of the PCI connector is arranged in the slot of memory controller drive.

18. A data storage library comprising:
 a plurality of memory modules, each memory module containing a plurality of memory chips for storing data, the memory chips arranged and mounted on a printed circuit board, the printed circuit board having an end portion having a PCI interface, without a memory controller tied or bundled to each memory module;
 a plurality of storage locations for holding the plurality of memory modules;
 one or more memory controller drives for performing memory operations in association with at least one of the plurality of memory chips on the plurality of memory modules, each memory controller drive being separate and independent of each memory module, having at least one memory controller to perform data operations with respect to the plurality of memory chips on each memory module, and having a slot to receive the PCI interface on the
 end portion to partially receive the memory module so that the memory module connects with and communicates with the memory controller to perform the data operations, wherein each memory module is separate from and independently transportable relative to the at least one memory controller;
 a transport system to move between the plurality of storage locations and the one or more memory controller drives;
 a library controller to control the movement of the transport system between the plurality of storage areas and the one or more memory controller drives;
 a housing configured to house the plurality of storage areas, the plurality of memory modules, the one or more memory controller drives, and the transport system;
 a processor;
 one or more computer readable non-transitory storage media; and
 programming instructions stored on the one or more computer readable non-transitory storage media for execution by the processor, the programming instructions comprising:
 programming instructions to determine a storage location within the library where a memory module containing the data is located;
 programming instructions to move an accessor to the storage location;
 programming instructions to move the accessor with the memory module to a memory controller drive;
 programming instructions to perform a memory operation with the memory controller drive and the memory module; and
 programming instructions to move the memory module away from the memory controller drive.

19. The storage library of claim 18, further comprising programming instructions to retrieve the memory module from the storage location so that the accessor can transport the memory module to the memory controller drive.

20. The storage library of claim 18, further comprising programming instructions to transport the memory module back to the storage location after the memory operation with the memory controller drive.

* * * * *